Figure 1:
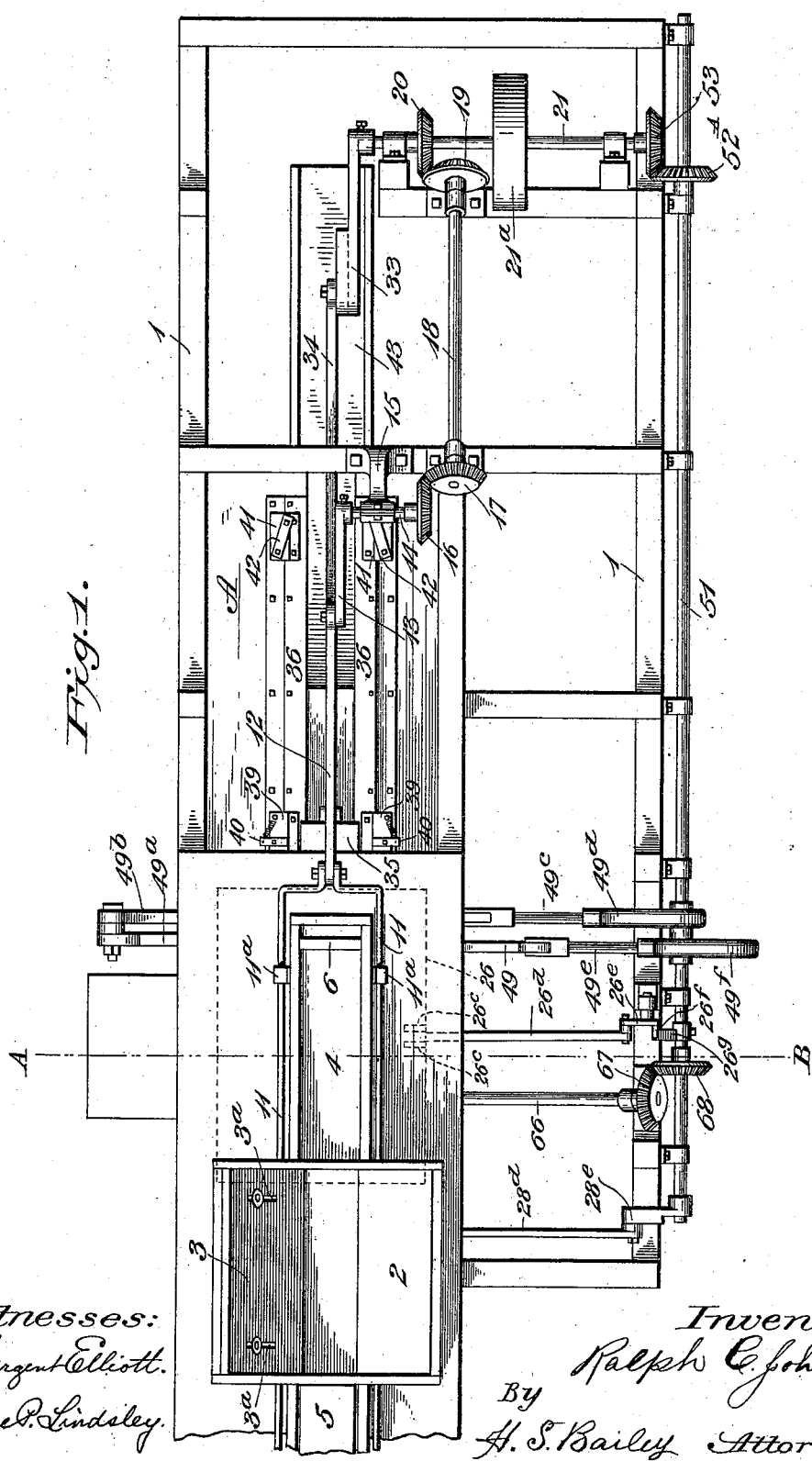

No. 695,561. Patented Mar. 18, 1902.
R. C. JOHNSON.
CORN HUSKING MACHINE.
(Application filed July 8, 1901.)
(No Model.) 8 Sheets—Sheet 1.

Witnesses:
J. Sargent Elliott.
Grace P. Lindsley.

Inventor:
Ralph C. Johnson.
By H. S. Bailey, Attorney.

No. 695,561. Patented Mar. 18, 1902.
R. C. JOHNSON.
CORN HUSKING MACHINE.
(Application filed July 8, 1901.)
(No Model.) 8 Sheets—Sheet 2.

Witnesses:
J. Sargent Elliott.
Grace P. Lindsley.

Inventor:
Ralph C. Johnson
By
H. S. Bailey, Attorney.

No. 695,561. Patented Mar. 18, 1902.
R. C. JOHNSON.
CORN HUSKING MACHINE.
(Application filed July 8, 1901.)

(No Model.) 8 Sheets—Sheet 4.

Witnesses:
G. Sargent Elliott.
Grace P. Lindsley.

Inventor:
Ralph C. Johnson
By
H. S. Bailey, Attorney.

THE NORRIS PETERS CO., PHOTO-LITHO., WASHINGTON, D. C.

No. 695,561. Patented Mar. 18, 1902.
R. C. JOHNSON.
CORN HUSKING MACHINE.
(Application filed July 8, 1901.)

(No Model.) 8 Sheets—Sheet 5.

Witnesses: Inventor:
G. Sargent Elliott. Ralph C. Johnson
Grace P. Lindsley. By
H. S. Bailey Attorney.

No. 695,561. Patented Mar. 18, 1902.
R. C. JOHNSON.
CORN HUSKING MACHINE.
(Application filed July 8, 1901.)

(No Model.) 8 Sheets—Sheet 7.

Witnesses:
G. Sargent Elliott.
Grace P. Lindsley.

Inventor.
Ralph C. Johnson
By H. S. Bailey Attorney.

THE NORRIS PETERS CO., PHOTO-LITHO., WASHINGTON, D. C.

No. 695,561. Patented Mar. 18, 1902.
R. C. JOHNSON.
CORN HUSKING MACHINE.
(Application filed July 8, 1901.)

(No Model.) 8 Sheets—Sheet 8.

Witnesses:
G. Sargent Elliott,
Grace P. Lindsley.

Inventor:
Ralph C. Johnson
By
H. S. Bailey, Attorney.

UNITED STATES PATENT OFFICE.

RALPH C. JOHNSON, OF EDGEWATER, COLORADO.

CORN-HUSKING MACHINE.

SPECIFICATION forming part of Letters Patent No. 695,561, dated March 18, 1902.

Application filed July 8, 1901. Serial No. 67,473. (No model.)

*To all whom it may concern:*

Be it known that I, RALPH C. JOHNSON, a citizen of the United States of America, residing at Edgewater, in the county of Jefferson and State of Colorado, have invented certain new and useful Improvements in Corn-Husking Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in corn-husking machines; and the objects of my invention are, first, to provide a machine for removing husks from corn in such a manner that the inner envelop can be saved and used as a wrapper for wrapping tamales and for other purposes; second, to provide a machine that will cut through the husks and into the corn in such a manner that the husks will be separated from the ear at substantially the point of their longest diameter and close to the butt-end of the cob; third, to provide means for automatically feeding the ears into the husking-machine one at a time in successive order; fourth, to provide means for conveying and discharging the husks one by one from the machine in successive order as they are removed from the ears of corn and for removing the ears of corn from the point in the machine where they are separated from the husks and for discharging them in successive order from the machine. I attain these objects by the mechanism illustrated in the accompanying drawings, in which—

Figure 2:
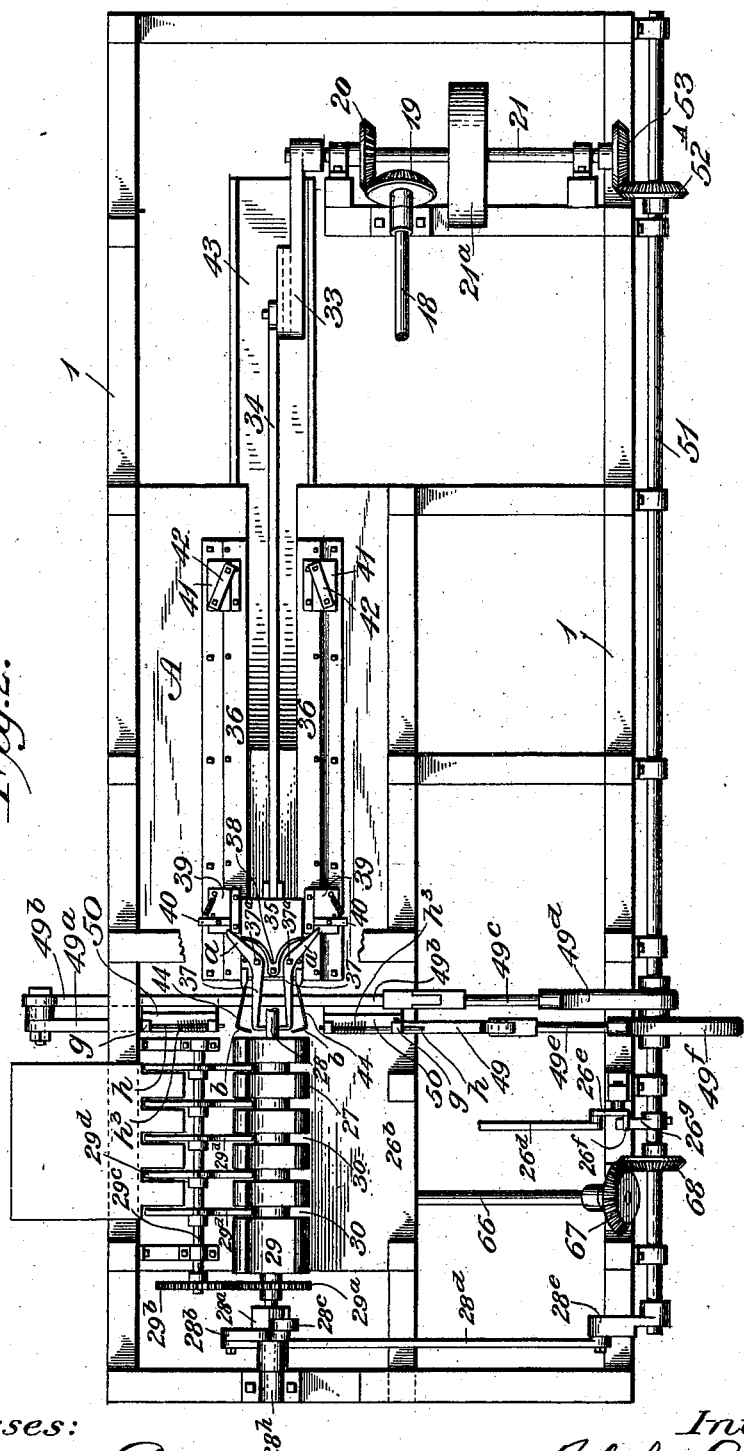
Figure 3:
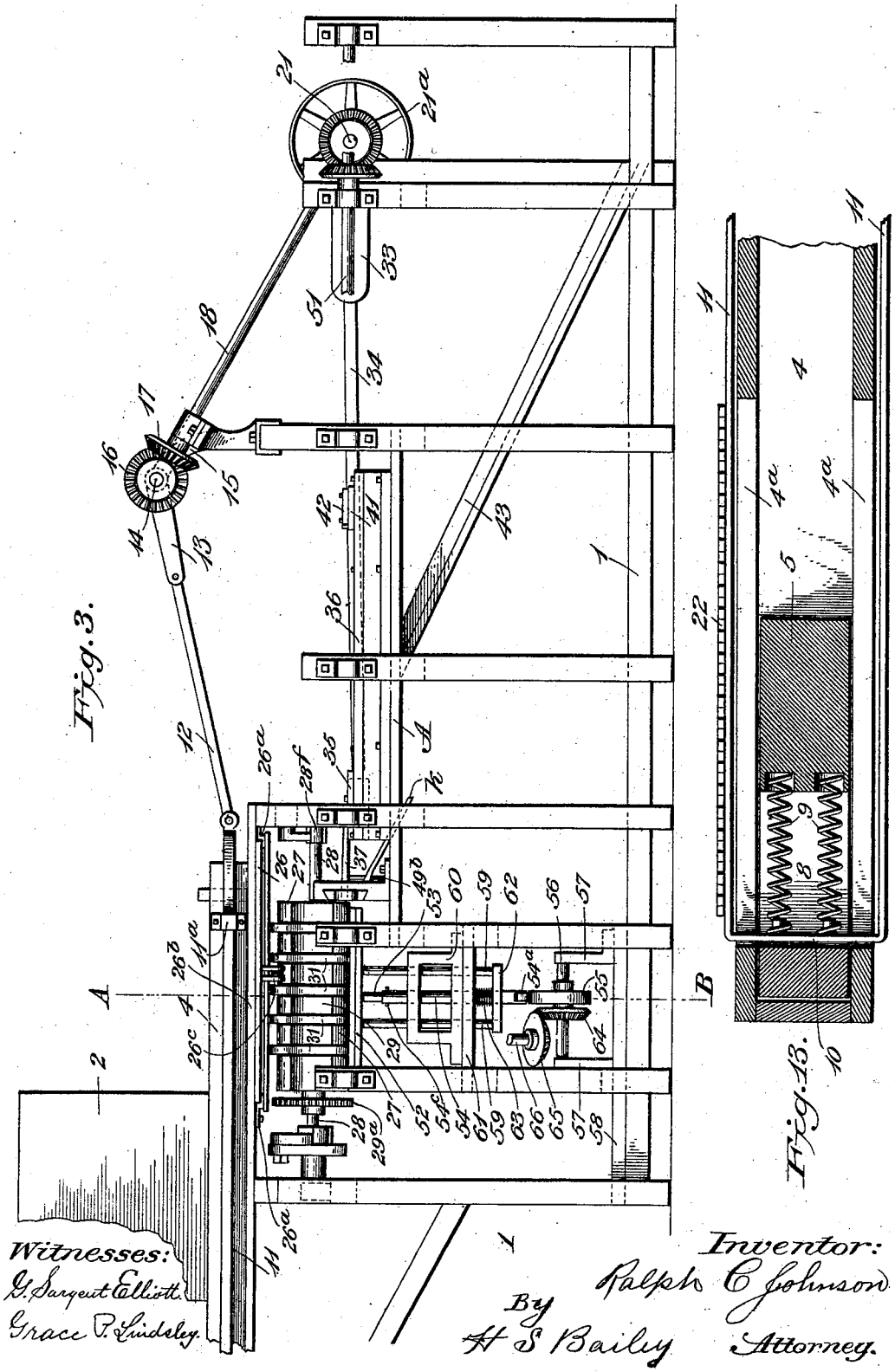
Figure 4:
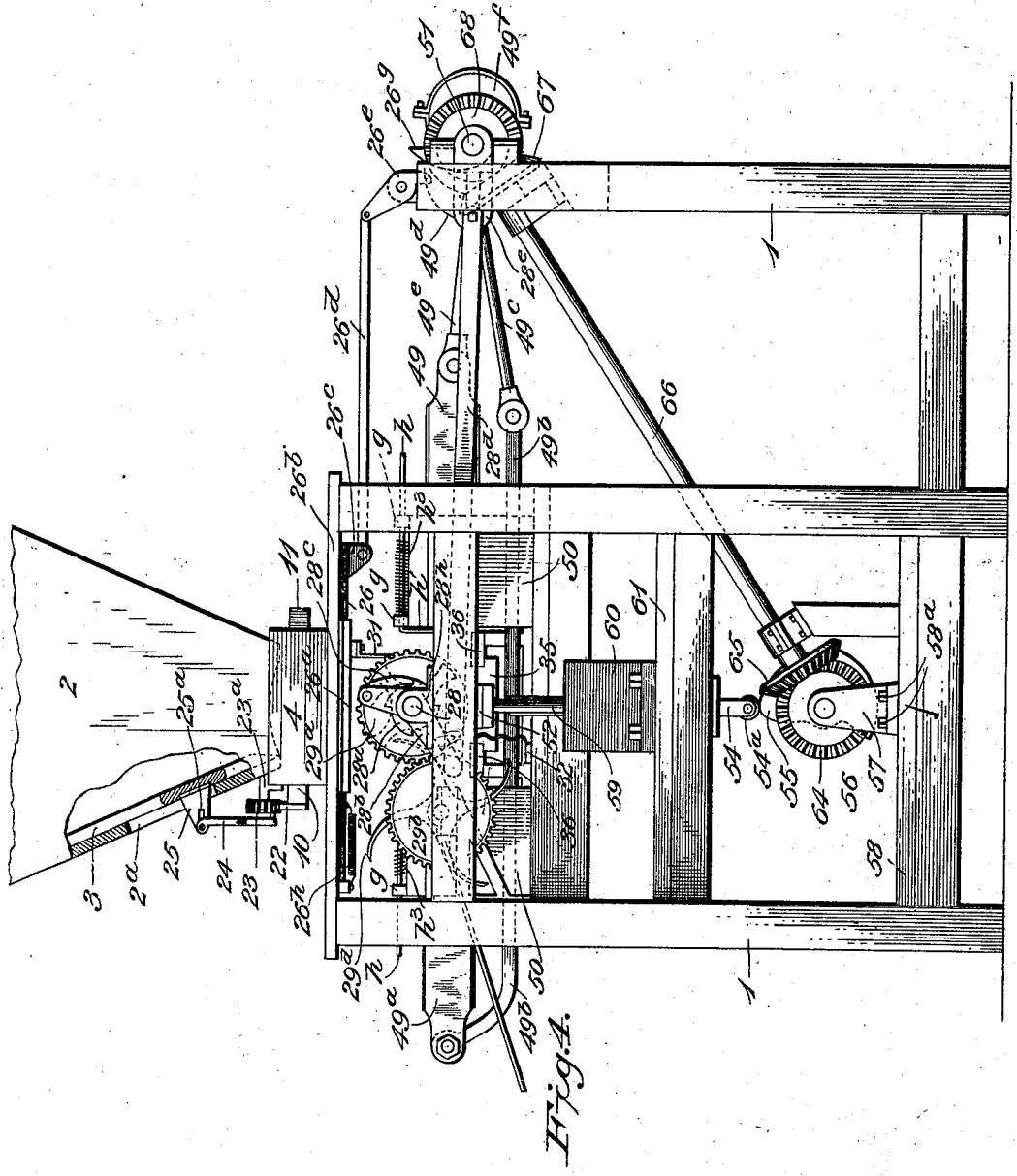
Figure 5:
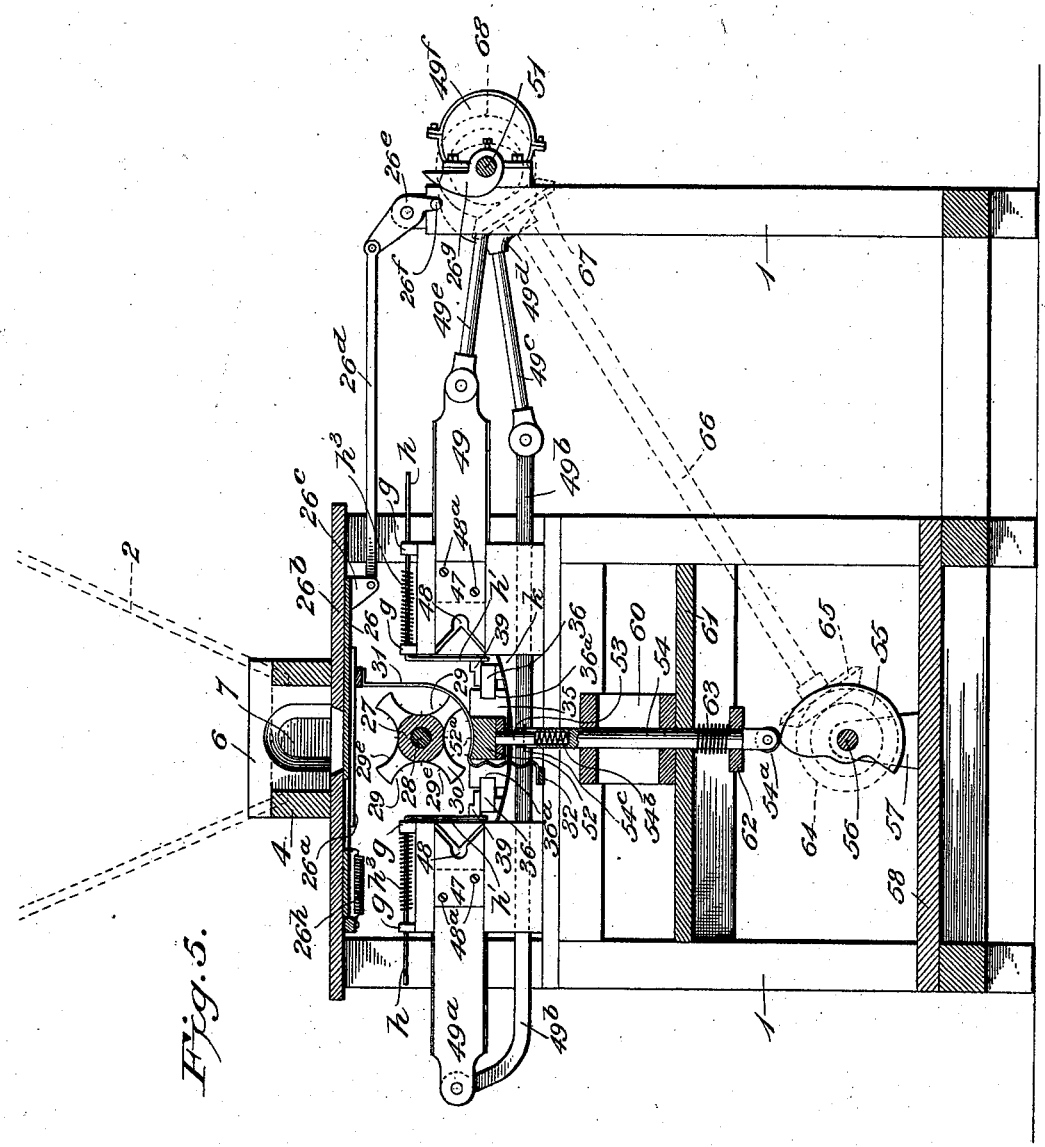
Figure 6:
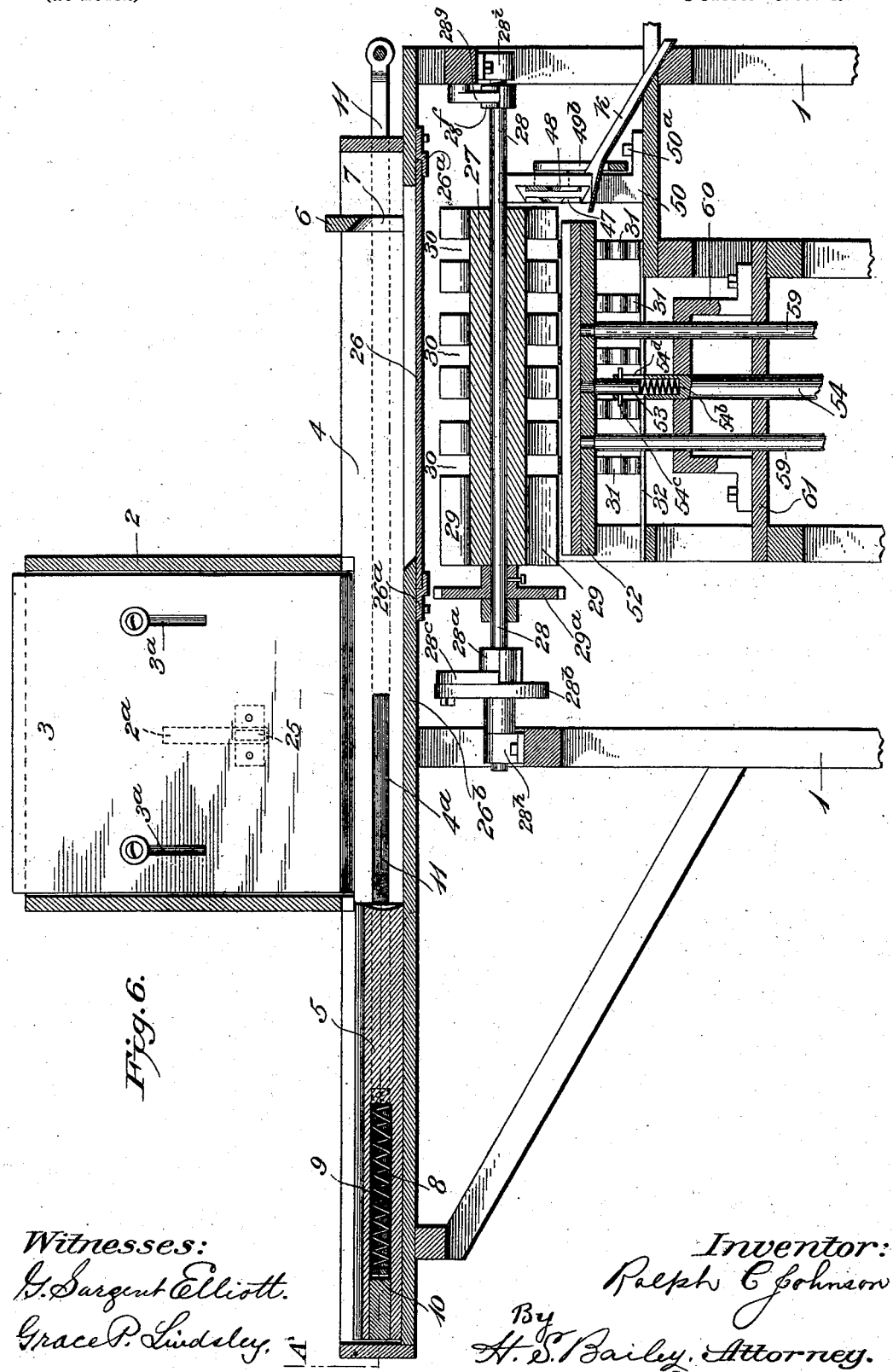
Figure 7:
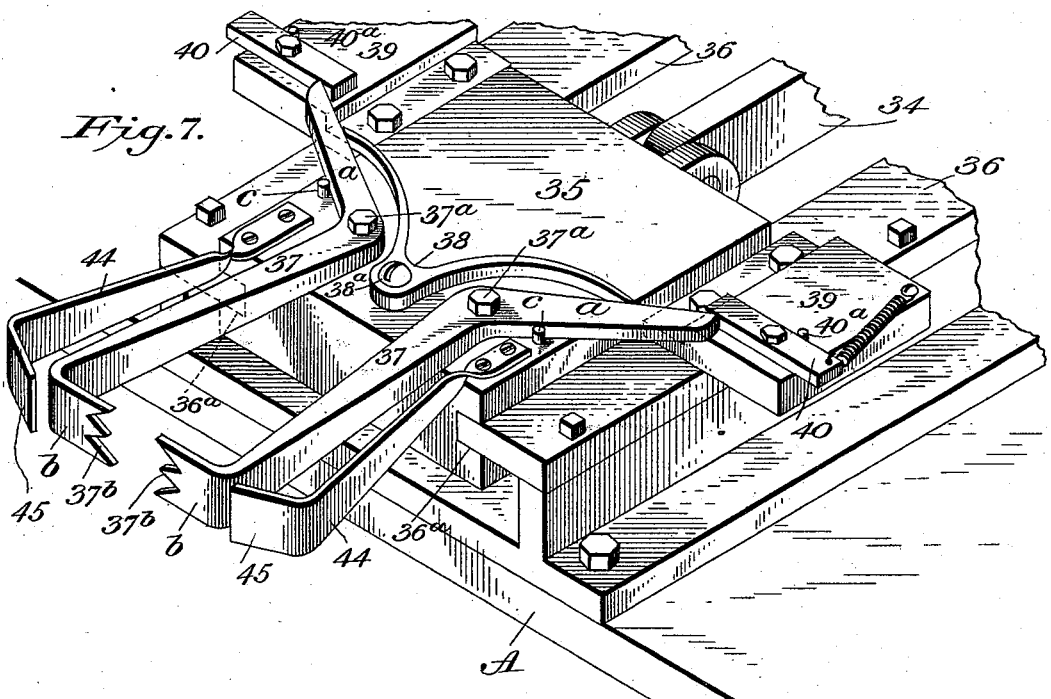
Figure 8:
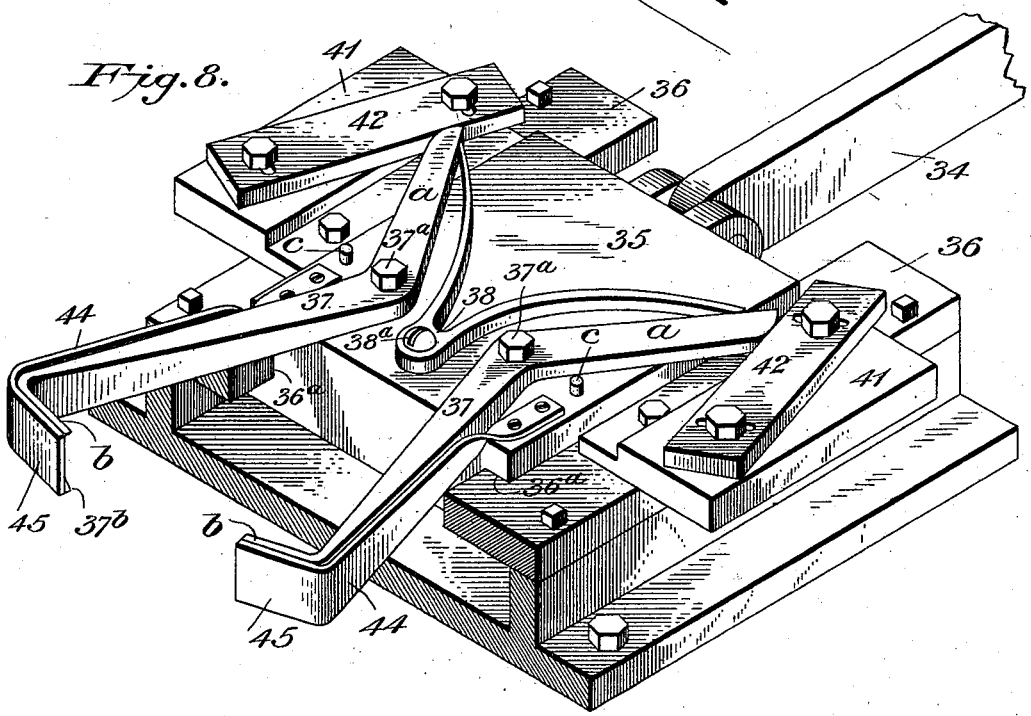
Figure 9:
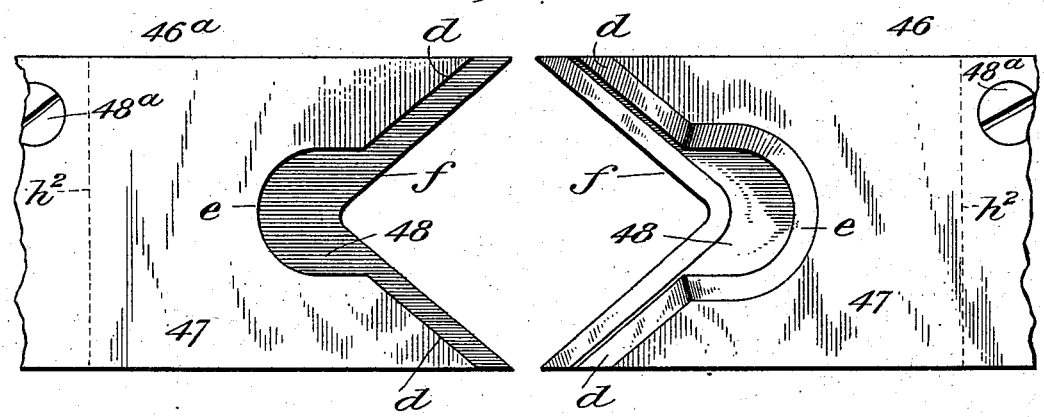
Figure 10:
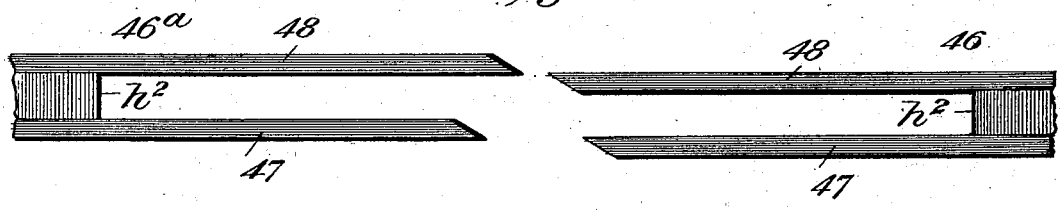
Figure 11:
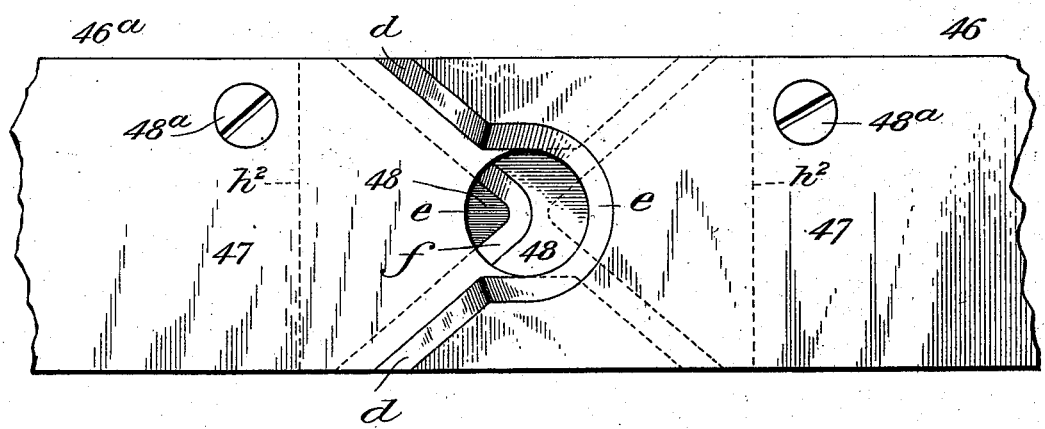
Figure 12:
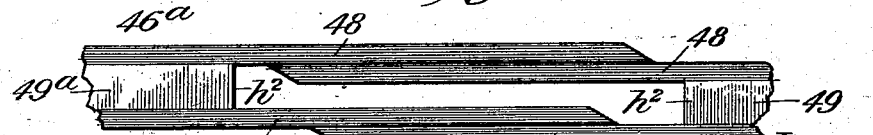

Figure 1 is a plan view of a machine embodying my invention. Fig. 2 is a plan view similar to Fig. 1, except with the feed-hopper removed to show the mechanism below the hopper. Fig. 3 is a side elevation of the machine, showing a fragment of the hopper with some of the parts broken away. Fig. 4 is an end elevation of the hopper end of the machine, showing a section through one side of the hopper. Fig. 5 is an end sectional elevation on line A and B of Figs. 1 and 3. Fig. 6 is an enlarged longitudinal sectional view of Figs. 1 and 3. Fig. 7 is an enlarged perspective view of the gripping mechanism that grips and conveys the ears from the husks, illustrating the jaws closed. Fig. 8 is a perspective view of the gripping-jaws, showing the jaws in an open position. Fig. 9 is a side elevation of the husk-cutting knives, showing the knives open. Fig. 10 is a plan view of the knives shown in Fig. 9, showing them open, as in Fig. 9. Fig. 11 is an elevation of the knives shown in Fig. 9, showing the knives closed; and Fig. 12 is a plan view of the knives shown in Figs. 11, 10, and 9 closed. Fig. 13 is a section on line A of the ear-feeding device.

Similar letters and figures of reference refer to similar parts throughout the several views.

Referring to the drawings, the numeral 1 designates the frame of the machine. This frame, as illustrated, is composed of a number of vertical wooden posts suitably framed to horizontal and transverse tie-pieces. My invention contemplates, however, a frame for supporting the elements of a machine of any suitable design and of either cast-iron or wood.

2 designates the hopper, which is positioned above and to the front end of the frame of the machine. The sides of this hopper converge, while the ends are vertically disposed. One of the converging sides is provided with a vertically-reciprocating slide 3, which is designed to move rapidly up and down, and this movement prevents choking or clogging of the ears of corn at the mouth of the hopper. The means for operating this slide will be hereinafter described. This hopper rests upon a trough or guideway 4, which in practice is wide enough and deep enough to receive an ear of the largest diameter. The trough or guideway extends for a considerable distance on each side of the hopper and at its forward end receives a sliding pusher 5, the rear end of which when the pusher is at the limit of its forward movement is just beneath the front end of the mouth of the hopper. The ears of corn are fed from the hopper into the trough one at a time, and as the pusher 5 moves rearwardly and beneath the hopper the ear of corn will be carried to the rear end of the trough, when it will be stopped by a stop-board 6, having a vertical slot 7, through which the stalk which varies in length on different ears may pass, thus allowing the ear proper to occupy such a position that when it is discharged into the revolving receiver (to be hereinafter described) its butt-end will lie in the path of the cutting-knives. It will be noticed that the ears of corn are fed into the hopper with their butt-ends toward the rear or next to the cutting-knives. The rearward movement of the pusher 5 is sufficient to carry ears of corn of the shortest length as far as the stop-board 6; but in order to properly deliver ears of varying lengths and even those of greatest length I have designed the mechanism shown in Fig. 6, which is as follows: The pusher 5 is provided at its forward end with a transverse slot 8, which extends about one-half of its length. In this slot is placed a pair of helical springs 9, one end of each of which bears against the rear wall of the slot 8 and the other ends engage the connecting portion 10 of a pair of rearwardly-extending arms 11, which slide in guides 11ª on the sides of trough 4 and are pivotally connected to a pitman-rod 12, as shown, which in turn is connected to a crank-arm 13, rigidly attached to a short shaft 14, journaled in a bearing 15, which is fastened to the main frame 1. The other end of the shaft 14 carries a beveled pinion 16, which meshes with a corresponding pinion 17 on a shaft 18, also journaled in bearings fastened to the main frame. The rear end of shaft 18 carries a bevel-pinion 19, similar in diameter and mesh to pinions 16 and 17, and pinion 19 in turn meshes with a corresponding pinion 20, secured to the main driving-shaft 21. The length of the crank-arm 13 is such that when it reaches the limit of its rearward throw it will have moved the pusher 5 far enough to the rear to push a short ear of corn up against the stop-board 6; but should a long ear fall in front of the pusher its butt-end will come in contact with the stop-board 6 before the crank-arm 13 has reached its rearward throw, in which event the pusher 5 will come to a standstill, and further revolution of the crank-arm 13 will, by means of pitman-rod 12, draw the rearwardly-extending arms 11 to the limit of their movement, the connecting member 10 thereof compressing the helical spring 9, and thus permitting the crank-arm 13 to complete its revolution without in any manner injuring the machine. It will thus be seen from the foregoing that by the use of a pusher such as I have described ears of corn of varying lengths can be moved to the delivery end of the trough 4, the pusher coming to a standstill whenever the butt-end of an ear comes in contact with the stop-board 6 and the arms 11 being permitted to reach the limit of their rearward movement by compressing the spring 9 through the medium of their connecting member 10. The sides of the trough 4 are provided with slots 4ª, in which the connecting member 10 of arms 11 will slide as the arms move back and forth. One of the arms 11 at about its central portion is provided with a rack-bar 22, the teeth of which engage with a toothed wheel 23, which is journaled on a bracket 23ª to one of the converging sides of the hopper 2. Eccentrically pivoted to the toothed wheel 23 is a jointed pitman-rod 24, the upper end of which is bifurcated and receives the slotted end of a short arm 25, which is attached to the reciprocating slide 3. This arm 25 projects through a slot 2ª in the hopper. As the arms 11 move back and forth that one having the rack-bar 22 will revolve the toothed wheel 23, and the pitman-rod 24 will, through the medium of the slotted arm 25, reciprocate the slide 3 so rapidly that any clogging of corn in the mouth of the hopper will be effectually prevented. The slide 3 is provided with slots 3ª, as shown, through which retaining-screws may pass to secure the slide in such a manner that it may have a free up-and-down movement, but will be retained in its place against the side of the hopper. Pitman-rod 24 moves vertically, while slide 3 moves on an angle with respect to the movement of pitman 24, and these two movements are effected by slot 25ª in arm 25 permitting pivot-pin in pitman-rod 24 to move back and forth as slide 3 moves in an inclined position up and down.

Beneath the delivery end of the trough 4 is a sliding bottom or floor 26, which at a predetermined time is automatically slid far enough to one side to allow an ear of corn which has previously been pushed into position to drop into a revoluble receiver 27. This receiver is rigidly secured to a shaft 28, journaled at each end in bearings 28ʰ and 28ⁱ, which are attached to the main frame. The receiver has an intermittent movement, the object of which will be hereinafter explained. This receiver is designed to catch the ears of corn as they fall from the trough 4 and to this end is made up from a block of wood or other substance which is round in cross-section and about fifteen inches in length. At equidistant points the block is provided with semicircular grooves 29, which extend from end to end and are of a depth substantially equal to the diameter of an ear of corn. In practice I provide the receiver with four of these grooves, though a greater number may be employed. The receiver is also provided at intervals with circumferential grooves 30, which intersect the horizontal grooves and are of the same depth. Depending from a part of the main frame above and to one side of the revoluble receiver 27 is a series of flat resilient springs 31, which lie in the path of the circumferential grooves 30 and extend around and under the receiver, where they take a downward turn and are secured to a bar 32. The lower ends of these springs are convoluted or crimped in order that they may give under pressure. When an ear of corn is dropped from the trough 4, it falls into the uppermost groove 29 of the revoluble receiver 27. As the receiver revolves the flat springs 31 bear against the ear, retaining it in place, and when an ear of large diameter is received the springs 31 by reason of their crimped ends before referred to will give sufficiently to accommodate themselves to the excessive strain.

I will now proceed to describe the manner of separating the husk from the ear and the means employed for accomplishing this result.

To one end of the main driving-shaft 21 is rigidly secured a crank-arm 33, to which is adjustably secured a connecting-rod 34. This rod may be so adjusted as to have a greater or less throw, as may be required. The rod 34 at its forward end is pivotally connected to a block 35, which slides on ways or guides 36, secured to a platform A. This sliding block 35 carries gripping-fingers 37, which are designed to withdraw an ear of corn from its husk on every rearward movement of the block, as will be shown. The ways or guides 36 fit in grooves $36^a$ in the vertical sides of the sliding block, giving it a direct and even motion back and forth, but preventing vertical or lateral displacement thereof.

The numeral 37 indicates the gripping-fingers before referred to, which are pivoted to the forward end of block 35. These fingers are similar in construction, each one being formed from a piece of iron or other metal of suitable dimensions, which is bent so that substantially a third of its length will lie at an angle of about forty-five degrees. At the point of the bend the metal is provided with a hole through which a securing-bolt $37^a$ may be passed. Near its end the longer member is bent at right angles to itself to form a jaw-beam, which is provided with three or more teeth $37^b$, as shown. The fingers are securely pivoted to the block, so that their rear ends $a$ will be outturned, as indicated in the drawings, while their forward inturned ends or jaws $b$ will normally lie near together. Interposed between the fingers is a substantially V-shaped spring 38, the members of which bear against the outturned ends $a$ of the fingers. The spring 38 is secured to the block by a screw $38^a$, as shown. The rear or flared ends $a$ of the fingers are thus normally held apart, while the jaws $b$ are closed or brought near together. Pins $c$, bearing against the front faces of the ends $a$, limit the movement of the fingers and keep the jaws $b$ a proper distance apart.

Near the forward end of each guideway 36 is secured a plate 39, upon which is pivoted a spring-controlled trip 40, and at the rear ends of the said guideways similar plates 41 are secured, and upon each of these plates is adjustably secured a metal strip 42. These strips are set at an angle, as shown, their rear ends converging, as will be seen by reference to the drawings.

Assuming that an ear of corn is in the receiver 27 ready to be husked, the sliding block 35 moves forward, and when it has nearly reached the limit of its forward movement the outwardly-flared members $a$ of the gripping-fingers 37 contact with the trips 40, which are held against forward movement by pins $40^a$ and are thrown inward or toward each other. This inward movement of the members $a$ compresses the spring 38 to such an extent that when the members $a$ pass the trips 40 they will be thrown apart with considerable force. The sliding block 35 will then have reached the limit of its forward movement, and as the members $a$ of the gripping-finger 37 escape the trips 40 the forward members or jaws $b$ will come together with sufficient force to tightly grip the butt-end of the ear of corn. As the sliding block 35 moves rearwardly the gripping-finger 37, carrying the ear which has been stripped of its husk, the outwardly-flared members $a$ will contact with the trips 40, move them against the action of their springs, and escape them without being affected, for it will be noticed that while the trips operate on the members $a$ during the forward movement of the sliding block 35 they are turned out of the path of the members $a$ on the rearward movement of the block, but are instantly thrown into their normal position or in the path of the members $a$ by the action of their springs. As the sliding block nears the limit of its rearward movement the members $a$ of the fingers 37 contact with the inclined faces of metal strips 42, and further movement forces the members $a$ toward each other, throwing the jaws $b$ apart and allowing the ear to drop on a chute 43, which delivers it to any suitable receptacle.

To prevent the ear of corn or any pieces of stalk or husk from clinging to the gripping-fingers 37 after they have been thrown apart, I secure to the forward end of the sliding block 35 a pair of stout spring-arms 44, which are shaped to correspond with the forward half of the fingers 37. These arms are placed at the angle which the forward half of the fingers 37 will assume when they are thrown open. It will thus be seen by reference to Fig. 8 that when the fingers 37 are thrown open they will lie against the spring-arm 44, and the inturned ends 45 of these arms having straight vertical edges, as shown, will push from between the teeth of the members $b$ of the fingers anything that may have adhered to them. When an ear of corn drops into the revoluble receiver 27, it is carried around until it reaches a position diametrically opposite from that in which it is received, in which position it is ready to be acted upon by the cutting-knives 46 and $46^a$. These knives are located just at the rear of the receiver 27, a pair on each side. They have a movement to and from each other and are designed to sever the stalk and cut through the husk, so that the latter may be removed intact. By reference to Figs. 9, 10, 11, and 12 it would be observed that the two knives which constitute a set or pair are different in construction. As shown, the two inner knives 47, or those nearest the receiver 27 and which are designed to cut through the husk, have upper and lower cutting edges $d$, which are at an angle of about forty-five degrees to each other, and these edges terminate in a substantially semicircular cutting edge $e$. In other words, the knife is ground in from its vertical edge in the form of a V and then continued back in the form of a semicircle. The outer knives 48, or those designed to sever the stalk, have V-shaped cutting portions $f$, as shown, and the extremities of the cutting portions may be blunt. The knives are secured by means of bolts or screws $48^a$ to sliding arms 49 and $49^a$, which slide in brackets 50, which are firmly secured to the platform $a$ by bolts $50^a$. The upper and lower edges of the sliding arm are beveled, as shown in Figs. 3 and 6, and the upper and lower edges of the slots or guideways in the brackets 50 are correspondingly beveled or dovetailed, and the arms fit slidingly into the brackets 50. They are secured against lateral displacement by their dovetailed bearing in the bracket, in which they have a reciprocating movement to and from each other. Referring again to Figs. 9, 10, 11, and 12, it will be seen that the pairs of knives 46 and $46^a$ are so positioned that they will slide upon each other and that when they have reached the limit of their inner movement the cutting-faces of the outer knives 48 have passed each other, completely severing the stalk, while the inner knives 47 by reason of their semicircular cutting-faces $e$ will form a circular cutting edge, which will cut through the husk, so that when the ear is gripped by the fingers 37 it may be withdrawn, leaving all the husk intact. To the outer end of the sliding arm $49^a$ is attached a connecting-rod $49^b$, which at its opposite extremity is pivotally attached to the eccentric-rod $49^c$ of an eccentric $49^d$ on a shaft 51, which at its rear end carries a beveled pinion $52^A$, in mesh with a corresponding pinion 53 on the main driving-shaft 21. To the outer end of the sliding arm 49 is pivoted an eccentric-rod $49^e$ of an eccentric $49^f$ on the shaft 51. It will be observed that the eccentrics $49^d$ and $49^f$ are oppositely set, so that when one is pulling the other is pushing, and vice versa. On the top of each bracket 50 are ears $g$, which are provided with holes, through which slides a spring-actuated rod $h$, having a member $h'$, which is at right angles to the sliding portion $h$. This depending member $h'$ is designed when a set of knives 46 or $46^a$ moves inwardly to pass between the two knives composing the set, and as the knives continue their inward movement the shoulder $h^2$, formed by the inner end of the sliding arm 49 or $49^a$, will contact with the member $h'$ and carry it forward against the action of the spring $h^3$, encircling the sliding member $h$. As the knives 46 or $46^a$ are withdrawn the action of the spring $h^3$ will cause the rod $h$ to withdraw also until the depending member $h'$ contacts with the inner face of the bracket 50, and as the knives are further withdrawn the depending member $h'$ will pass out from between them, carrying with it any pieces of stalk or husk which may have lodged between the knives. By this simple device the space between the two knives composing a set or pair will always be kept free from particles of stalk or husk, which would otherwise clog the space and impair the action of the knives.

In order to properly hold the ear of corn so that the husk may be retained in the receiver 27 while the ear is withdrawn, I provide a suitable clamp 52, which moves vertically up and down beneath the receiver. This clamp consists of a block of wood the length of the receiver and concaved on its upper side. Rigidly secured to the central portion of the under side of the clamp is a short depending post 53, which fits into and has a telescopic movement in the tubular end of a cam-operated plunger-rod 54, which at its lower end is provided with an antifriction-roller $54^a$, which rides upon a cam 55, mounted on a shaft 56, having bearings in suitable brackets 57, secured to a platform 58 by the bolts $58^a$. As the cam 65 raises the plunger-rod 54 the clamp 52 will be pressed against the ear of corn to securely retain it in position in the receiver 27. It will be observed that as the cam 55 raises the plunger-rod 54 a given distance at each revolution and as ears of corn of varying diameters are to be clamped some means must be employed whereby the clamp will effectively operate on ears of the smallest as well as the largest diameter. To this end the upper end of the plunger-rod 54, which is tubular, carries a helical spring $54^b$, upon which the depending post 53 bears. This spring $54^b$ exerts a constant upward pressure on the depending post 53, and consequently upon the clamp 52. It will thus be seen that while normally the clamp will hold ears of corn of the smallest diameter it will, by reason of the telescopic movement of the post 53 against the action of the spring $54^b$ in the tubular upper end of the plunger-rod 54, accommodate itself automatically to ears of corn of all diameters. The depending post 53 is retained in the upper end of plunger-rod 54 by a pin $54^c$, which passes through the post 53 and through vertical slots $54^d$ in the plunger-rod. The pressure of the spring $54^b$ against post 53 will cause the pin $54^c$ to remain normally at the upper end of the slots $54^b$. When the highest point of the cam 55 passes from under the roller $54^a$ in the lower end of the plunger-rod 54, the plunger-rod, together with the clamp 52, is designed to drop suddenly in order that the receiver 27 may continue its revolution. This sudden drop is effected by gravity and by the assistance of a spring, as will be clearly pointed out.

On either side of the depending post 53 are guide-rods 59, secured to the clamp 52. These guide-rods extend through a casting 60 and a platform 61, upon which the casting 60 is secured, and are connected at their extremities by a bar 62. The plunger-rod 54 also passes through the casting 60 and platform 61 and continues down through the bar 62, as shown. Encircling the plunger-rod 54 and interposed between platform 61 and bar 62 is a strong helical spring 63, which will insure the drop of the clamp 52 at the proper time. The guide-rods 59 and plunger-rod 54 will, by passing through casting 60 be given an even vertical movement, and the upper face of the clamp 52 will always lie on a horizontal plane.

The cam 55 is operated as follows: On the shaft 56 is a beveled pinion 64 in mesh with a similar pinion 65 on a shaft 66. The other end of this shaft is provided with a beveled pinion 67, meshing with a similar pinion 68 on the shaft 51, which receives its motion from the main driving-shaft, as shown.

As before mentioned, the revoluble receiver 27 has an intermittent movement. The object of this movement and the means for accomplishing it will now be pointed out.

When an ear of corn falls into the uppermost groove 29 of the receiver 27, another ear is just about to be withdrawn from the lowermost groove 29 by the gripping-fingers 37. During the period covered by the receiving of one ear and the withdrawal of another ear the receiver 27 must remain stationary. At the rear end of the shaft 28, upon which the receiver 27 is mounted, is rigidly attached a ratchet-disk $28^a$, having four ratchets. Loosely mounted on shaft 28 to one side of this disk is a bell-crank or bent lever $28^b$, the shorter member of which carries a pawl $28^c$, designed to engage the ratchets of the disk $28^a$. The longer or lower end of bell-crank is pivotally attached to a pitman-rod $28^d$, the other end of which is adjustably attached to a crank-arm $28^e$, carried by the forward end of the shaft 51. It will thus be seen that the back-and-forth movement of pitman-rod $28^b$ through its connection with crank-arm $28^e$ will impart an oscillating movement to bell-crank lever $28^b$, carrying the pawl $28^c$, which pawl on its forward movement will give the ratchet-disk $28^a$ a quarter-turn, and as the disk is rigidly secured to the shaft 28, carrying the receiver 27, the said receiver will also be given a quarter-turn, thus bringing an empty receiving-groove 29 in position to receive a fresh ear of corn from the trough 4. Thus on the backward movement of the pawl $28^c$ the receiver 27 will remain at rest, and it is at this pause or rest that an ear of corn is received into the uppermost groove of the receiver, while another ear is being separated from its husk at the lowermost groove. The clamp 52 meanwhile, having reached the limit of its upward movement, exerts sufficient pressure to hold the receiver 27 stationary. To prevent backward movement of the receiver 27, the shaft 28, upon which it is mounted, is provided at its rear end with a ratchet-disk $28^f$, which is engaged by a gravity-pawl $28^g$, as shown.

Just in front of the receiver 27 and keyed on the shaft 28 is a gear-wheel $29^a$, which meshes with a similar wheel $29^b$ on a shaft $29^c$, located on the left-hand side of the receiver 27. The shaft $29^c$ has bearings in brackets attached to the frame of the machine and carries the husk-releasers $29^d$. These husk-releasers $29^d$ are made up, as clearly seen in Fig. 4, of a central portion or hub from which project four fingers, which are curved in the manner shown. The shaft $29^c$, which carries the releasers $29^d$, is on a slightly-lower plane than the shaft 28, which carries the receiver 27; but the two shafts move in unison. When an ear of corn has been withdrawn from its husk, the clamp 52 descends and allows the receiver to continue in revolution, the flat springs 31, which extend under the receiver and between it and the clamp 52, holding the husk from dropping out. Now the releasers $29^d$ are so timed with respect to the revolution of the receiver that as the husk reaches the point where the springs 31 take a downward bend a finger of each of the releasers moves in behind the husk through the circumferential grooves 30 in the receiver, and as the revolution of the releasers is continued, the receiver moving in the opposite direction at the same time, the husk will be withdrawn from the receiver, carried over by the fingers of the releasers and deposited upon a chute, which will deliver them to a suitable receptacle. The semicircular grooves 29 of the receiver and the upper surface of the clamp 52 are provided with small pins $29^e$ and $52^a$, respectively, which will pierce the husk, and thus prevent it from being withdrawn with the ear.

The sliding bottom or floor 26, which drops the ear from the trough 4 into the receiver, slides in guides $26^a$, secured to the under side of the platform $26^b$, which supports the trough 4. One end of this sliding bottom is provided with depending ears $26^c$, between which one end of a connecting-rod $26^d$ is pivoted. The other end of this rod is pivoted to the longer member of a trip-lever $26^e$, pivoted on a bracket, which is secured to the frame adjacent to the shaft 51. The shorter member of the aforesaid trip-lever is provided with a tail $26^f$, which lies in the path of a cam $26^g$, secured to the shaft 51. This cam is so timed that when an ear of corn is ready to be dropped into the receiver the said cam in its revolution on shaft 51 will strike the tail $26^f$ on the short member of trip-lever $26^e$, giving the upper and longer member, to which the forward end of connecting-rod $26^d$ is pivoted, a quick backward motion, which will withdraw the sliding bottom 26 and allow the ear to drop into the receiver. As soon as the cam $26^g$ escapes the tail $26^f$ a helical spring $26^h$, secured to the rear side of the sliding bottom, will quickly return said bottom to its normal position.

The pieces of stalk severed by the cutting-knives will fall upon a chute $k$, as clearly shown in Fig. 6, which will convey them to any suitable receptacle.

Having fully described the various parts of my improved corn-husking machine, I will proceed to outline the operation of the machine as a whole.

Assuming that the sliding block 35, carrying the gripping-fingers 37, is at the limit of its forward movement, the several parts which contribute in carrying out the objects of the machine are in the following relative positions: The crank-arm 13 is at the limit of its forward throw, and the pusher 5, through its connection with crank-arm 13, is also at the limit of its forward movement or just below and to one side of the hopper. The upper groove 29 of receiver 27 has just received an ear of corn. The next groove following the direction of revolution of the receiver is also provided with an ear. The bottom groove retains an ear which has just been operated on by the knives and is about to be withdrawn from its husk, and the remaining groove carries a husk which has been separated from its ear and is in the act of being released from the receiver by the fingers of the releasers 29$^d$. The cutting-knives through their respective eccentrics are withdrawn to the limit of their outward movement. Cam 26$^g$ has escaped the tail 26$^f$ of lever 26$^e$, which through connecting rod 26$^d$ operates sliding bottom 26. Cam 55 is at that part of its revolution where its highest point, or that part of its circumference farthest from its axis, is in contact with roller 54$^a$ of plunger-rod 54, clamp 52 consequently being at the limit of its upward movement and pawl 28$^e$ on bell-crank 28$^b$ through its connection with pitman-rod 28$^d$ and crank-arm 28$^c$ is moving backward or out of contact with one of the ratchets on disk 28$^a$. It will be observed that all the beveled pinions which are employed in the operation of my machine are of one size and mesh and that consequently a revolution of main shaft 21 through its pulleys 21$^a$ will effect a revolution of each of the beveled pinions simultaneously. Now as the sliding block 35 moves rearwardly its gripping-fingers 37 carrying an ear of corn, the highest point of cam 55 passes from under plunger-rod 54, and the rod, as well as clamp 52, will descend rapidly by reason of the action of springs 63, the surface of cam 55, as shown in Fig. 5, permitting this drop. Pawl 28$^e$ now engages one of the ratchets on disk 28$^a$, revolving the receiver one-quarter of a revolution and bringing an ear of corn in position to be operated upon by the knives, which at the same time are moving inward to perform their work. As the sliding block 35 reaches the limit of its rearward movement the outwardly turned or flared member $a$ of the gripping-fingers 37 will contact with the inclined faces of strips 42, causing the ear of corn to drop on chute 43, as previously described. The pusher 5 meantime through its connection with arms 11, pitman-rod 12, and crank-arm 13 will have moved an ear of corn to the rear end of trough 4, ready to be discharged into the receiver 27. When a complete revolution of the driving-shaft 21 and its crank-arm 33 has been completed, a complete cycle of movements of the different mechanisms has also taken place, and the operation is repeated.

While I have expressly designed my corn-husking machine for the express purpose of cutting the husks in such a manner that they are expressly adapted for wrappers for tamales and for use for mattresses and other purposes, my machine is expressly adapted for husking corn in the field as the ears are picked from the stalks regardless of subsequent use of the husks.

Having described my invention, what I claim as new, and desire to secure by Letters Patent, is—

1. In a corn-husker the combination with a suitable supporting-frame, of a hopper provided with an ear-agitator comprising a plate slidably supported in said hopper, means for reciprocating said ear-agitator, a trough below said hopper, an ear-husker arranged to move each ear laterally a predetermined distance from the discharge-outlet of said hopper, an ear-receiver under said hopper comprising a fluted roller, a pawl-and-ratchet mechanism arranged to rotate said ear-receiver step by step intermittently, a slide in the bottom of said hopper, and a trough arranged and adapted to discharge an ear intermittently into one of the flutes of said ear-receiver, substantially as described.

2. In a corn-husker, the combination of the hopper, the hopper-trough, the ear-husker, and the slides, with the ear-receiver compressing a roller provided with tapering flutes containing each a plurality of short husk-piercing pins, a pawl-and-ratchet mechanism at one end of said roller arranged to impart a predetermined step-by-step movement to said ear-receiver, a pawl-and-ratchet mechanism at the opposite end of said ear-receiver arranged to lock automatically said ear-receiver at the end of each operative, rotative movement against accidental displacement, circumferential grooves in said ear-receiver, and springs arranged in said grooves to resiliently hold the ears of corn in the flutes of said ear-receiver during a predetermined portion of its rotative movement, substantially as described.

3. In a corn-husker, the combination with the supporting-frame, the hopper and the ear-receiver, of a clamp comprising a block reciprocatively supported below said ear-receiver and provided with a concaved, ear-holding groove arranged to register opposite said ear-receiver, a plurality of short pins in said concaved ear-receiving portion of said clamp, a support for said clamp having a yielding and resilient portion adapted to allow said clamp to adjust itself to ears of different sizes, and means including a cam for moving said clamp to and from said ear-receiver to clamp and release said ears at intermittent and predetermined periods of time substantially as described.

4. In a corn-husking machine, the combination with the frame, the ear-receiver and the ear-clamp, of husk and butt cutting knives comprising a pair of double knives arranged with their cutting ends opposite each other and to reciprocate to and from each other in shearing relation to each other, and having one set of knives arranged to cut the husks free from the ear immediately adjacent to the butt-end of the ear and the other set arranged to cut the butt from the ear close to the corn, and means for supporting and for reciprocating said knives in unison with the intermittent movements of said ears from the hopper to the said ear-clamp and ear-receiver, substantially as described.

5. In a corn-husker, the combination with the supporting-frame, the hopper, the ear-receiver, the ear-clamp and the ear husk and butt cutting knives, of an ear-gripping device for gripping and removing an ear from its husks while clamped between said clamp and said ear-receiver when cut free from its husks comprising a pair of ear-gripping jaws arranged to reciprocate to and from said clamp and ear-receiver and comprising a pair of oppositely-arranged toothed finger-jaws, means including a spring for holding said finger-jaws normally closed, means for opening said jaws to allow them to move over an ear and for instantly releasing them to allow said spring to force them to grip an ear at the end of its stroke adjacent to said clamp and ear-receiver, and means for releasing the said ear from said finger-jaws, and for reciprocating said jaws in unison with the operative movements of said ears in said clamp and ear-receiver, substantially as described.

6. In a corn-husker, the combination with the frame, the hopper, the step-by-step rotating ear-receiver, the ear-clamping block, the knives and the ear gripping, removing and discharging device, with a husk removing and discharging device comprising a plurality of fingers arranged and adapted to move in under the husks as they are held in the ear-receiver after the ear has been extracted by said ear gripping and removing and discharging device, a system of gearing arranged between said ear-receiver and said husk-removing fingers arranged and adapted to move said fingers in an opposite direction from the direction the ear-receiver rotates in, and adapted to operate them at the same time and in unison with the movement of said ear-receiver, substantially as described.

7. In a corn-husker, the combination with the supporting-frame, of the driving-shaft operatively mounted in said frame, a slideway on said supporting-frame, a reciprocating cross-head operatively mounted in said slideway, the ear-gripping jaws pivotally mounted intermediate of their ends on said cross-head and projecting beyond it, having their projecting end introverted and formed into teeth and their opposite ends diverged outward from one another, a spring between said diverging ends arranged to normally hold said jaws in gripping position, stops arranged to define the gripping position of said jaws, a crank-arm connected to said driving-shaft, a connecting-rod pivotally and adjustably secured at one end to said crank-arm and at its opposite end pivotally connected to said cross-head and adapted to impart a reciprocal movement to said cross-head and ear-gripping jaws, means including inclined planes arranged on each side of said slideway and in the path of the backward or return reciprocal stroke of the outward diverging ends of said gripping-jaws and at the end of said return reciprocal movement for opening said jaws, substantially as described.

8. In a corn-husking machine, the combination with a suitable supporting-frame, of an ear-holding hopper supported on said frame, a trough under said hopper, an ear-pusher reciprocatively mounted in said hopper, an actuating-lever arranged in engagement with said pusher, compensating springs arranged between said lever and pusher, a stop arranged in said trough to define the movement of said pusher, a reciprocating slide arranged in the bottom of said trough adjacent to said stop, a spring controlled in one direction of its movement, a reciprocating ear-agitator arranged in said hopper, means for reciprocating said slide, means for reciprocating said ear-pusher and its actuating-lever, and means for instantaneously opening and closing the slide in the bottom of said trough, substantially as described.

9. In a corn-husking machine, the combination with a suitable frame, of an ear-feeding hopper mounted thereon, means for discharging said ears from said hopper intermittently, with an ear-receiver positioned to receive said ears from said hopper, and comprising a roller rotatably mounted on said frame and provided with a plurality of tapering ear-receiving recesses arranged longitudinally with its axis, a plurality of circumferential recesses in said ear-receiving roller spaced at suitable distances apart, springs arranged to project into said recesses and to surround a predetermined portion of the circumference of said roller, and means for intermittently rotating said roller, substantially as described.

10. In a corn-husking machine, the combination with a suitable frame, of an ear-holding hopper mounted thereon, means for feeding ears of corn one at a time intermittently from said hopper, an ear-receiver arranged under said hopper and arranged to turn intermittently step by step, means including springs for temporarily holding said ears in said receiver, means for intermittently rotating said receiver step by step in unison with the ear-feeding mechanism of said hopper, and an ear-clamping device comprising a block positioned under said ear-receiver provided with a concaved face and arranged to vertically reciprocate to and from said receiver, a vertical shaft depending from said block, suitably-arranged guides depending from said block, a cam arranged at the lower end of said shaft arranged and adapted to raise said clamping-block into operative relation to clamp an ear of corn in said receiver and to allow said block to drop to a position of disuse after a predetermined period of time, and means for rotating said cam to operate said clamping-block in unison with the rotative movement of said ear-receiver and at predetermined periods of time, substantially as described.

11. In a corn-husking machine, the combination with a suitable supporting-frame, of a hopper mounted on said frame and arranged and adapted to feed ears of corn one by one intermittently, an ear-receiving device arranged to receive said ears at its top portion from said hopper one at a time and to rotatively convey them step by step to its under side, an ear-clamping device arranged to intermittently engage clamp and release each ear of corn against the bottom side of said ear-receiver at predetermined periods of time, with two pairs of reciprocating knives arranged side by side at a short space apart and at right angles to said ear-receiver, one pair of which is provided with a central, circumferential cutting-recess that coöperatively closes on each ear and cuts through the husk of the ear into the corn immediately adjacent to the butt-end of the ear, and the other set of which is provided with V-shaped cutting-recesses arranged to reciprocate overlappingly by each other and cut the butt from the ear, and means for reciprocating each set of knives to and from each other so that they will meet each other in cutting relation intermittently in the axial path in which each ear of corn is held by said clamp against said ear-receiver, substantially as described.

12. In a corn-husking machine, the combination with a suitable supporting-frame, the hopper and the ear-receiver of a clamp comprising a block reciprocatively supported below said ear-receiver and provided with a concaved, ear-holding groove arranged to register opposite said ear-receiver, a plurality of short pins in said concaved ear-receiving portion of said clamp, a support for said clamp having a yielding and resilient portion adapted to allow said clamp to adjust itself to ears of different sizes, and means including a cam for moving said clamp to and from said ear-receiver, and an ear gripping and discharging device arranged and adapted to reciprocate to and from said ear-receiver and ear-clamping block comprising a pair of oppositely-arranged jaws having one of their ends introverted toward each other and serrated into teeth, and pivotally secured intermediate of their ends to a reciprocating cross-head operatively mounted in a slideway arranged in axial alinement with said husking-ear and having their opposite ends spring-controlled to normally hold said gripping-jaws in operative gripping relation, means including a spring-controlled, pivotal clip arranged on each side of said slideway in the reciprocal path of said gripping-jaws and of said cross-head within operative gripping relation to the ear of corn held by said clamp against said ear-receiver and arranged and adapted to open said gripping-jaws as they pass them at the end of the operative reciprocal movement, and to allow said jaws to snap under the action of their controlling-springs against and grip the opposite side of the ear held between said clamps and receiver, and to withdraw said ear from said husks, and an inclined member secured on each side of said cross-head to the opposite end of said slideway and arranged to engage the opposite ends of said gripping-jaws at the end of their backward reciprocal stroke arranged and adapted to open said jaws and release said ears, an arm arranged close to but out of the gripping plane of the end of each of said jaws, and adapted to disengage from the teeth of said jaws any adhering portions of said ears or husks, an opening between the opposite sides of said slideway and a chute below said opening onto which said ear drops, and means including a crank and connecting-rod for reciprocating said gripping-jaws in unison with the operative movements of said hopper, ear-receiver, clamp and knives, substantially as described.

13. In a corn-husking machine the combination with the frame, the ear-receiver and the clamp, of husk and butt cutting knives comprising a pair of double knives arranged with their cutting ends opposite each other and to reciprocate to and from each other in shearing relation to each other and having one set of knives arranged to cut the husks free from the ear immediately adjacent to the butt-end of the ear and the other set arranged to cut the butt from the ear close to the corn, and means for supporting and for reciprocating said knives in unison with the intermittent movements of said ears from the hopper to the said ear-clamp and ear-receiver and with a husk removing and discharging device comprising a shaft mounted parallel with a plurality of fingers operatively mounted on said shaft and arranged under said husk after the ear is withdrawn from them by said gripping-knives, and means for operating said fingers in unison with the rotative movement of said ear-receiver, substantially as described.

14. In a corn-husking machine, the combination with a suitable supporting-frame, of a driving-shaft, a crank connected to said shaft, a connecting-rod adjustably connected at one end to said crank, a cross-head pivotally connected to said connecting-rod, a way in which said cross-head is reciprocatively mounted, and spring-controlled ear-gripping jaws, substantially as described.

15. In a corn-husker the combination of the supporting-frame, the driving-shaft, the crank-arm connected thereto, the slideway in said frame, the cross-head in said slideway, the connecting-rod pivotally connecting said cross-head with said crank-arm, with spring-controlled ear-gripping jaws pivotally secured intermediate of their ends to said cross-head and projecting beyond its opposite end from said connecting-rod, the inclined planes secured to said slideway adapted to open said jaws at the end of their return reciprocal stroke, and the levers pivoted on each side of said slideway at their opposite ends and arranged to be engaged by said jaws as they pass them and to open said jaws against their spring as said jaws pass them, and to release said jaws in operative gripping relation to an ear of corn, and arranged to move out of the path of said jaws on their return stroke, substantially as described.

16. In a corn-husking machine, the combination of the supporting-frame, the driving-shaft, the crank-arm, the slideway, the cross-head, the gripping-jaws pivotally mounted on said cross-head and the inclined planes for opening said jaws at the end of their return stroke, with the device at the forward end of said slideway for actuating said jaws to grip an ear of corn comprising a lever pivoted intermediate of its ends on each side of said slideway in the path of said gripping-jaws, a stop arranged to prevent the movement of said levers out of the path of said jaws as they pass them, whereby said jaws are spread apart and spring together after passing said lever and arranged to be moved by said jaws out of their path on their return stroke and a spring for returning said levers to their normal positions, substantially as described.

17. In a corn-husker, the combination with the supporting-frame, the hopper, the ear-receiver and the ear-clamp, and the ear gripping and removing and discharging device, of the husk-cutting and the stalk-butt-cutting knives, comprising two knives reciprocally mounted in suitable bearings and arranged in end-to-end shearing alinement, and each knife consisting of two parallel knives spaced a short distance apart, connecting-rods pivotally connected to each knife, and a pair of eccentrics operatively mounted on said driving-shaft and set at diametrically opposite points of their throw and each operatively connected to the said connecting-rods of said knives, and arranged and adapted to reciprocate said knives to and from each other and to and from the axial position and path of the corn to be husked, substantially as described.

18. In a corn-husking machine, the combination of the supporting-frame, and the transversely-arranged driving-shaft, of the ear-feeding hopper, the slideway in said hopper adapted to agitate said corn, the trough below said hopper, with an ear-pusher block fitting slidably in said trough below said hopper, a slot transversely through said pusher, a slot in the sides of said trough, a yoke-shaped lever arranged with its sides extending alongside of said trough and its yoke end extending through said slot in said pusher-block, compression-springs arranged between the yoke end of said lever and the end of said slot nearest its ear-engaging end, whereby a flexible or yielding connection is established between said block and said yoke-lever, a connecting-rod pivotally connected at one end to said yoke-lever, and means including a crank-arm connected to said connecting-rod and to said driving-shaft for imparting a reciprocating movement to said yoke-lever and said ear-pusher block, substantially as described.

19. In a corn-husker, the combination with the supporting-frame, of the hopper, a reciprocating slide arranged in said hopper, a trough arranged under the discharge-outlet of said hopper, an ear-pusher block arranged in said trough, a lever connecting to said pusher-block with said yielding or resilient connection, a toothed rack on said lever and a pinion supported to be rotated by the reciprocal movement of said rack and lever, a crank-pin secured to the side of said pinion and a connecting-rod arranged to connect said crank-pin and said ear-agitating slide of said hopper together, and a stop in the end of said trough to define the operative movement of said pusher-block, substantially as described.

20. In a corn-husker, the combination with the supporting-frame, a driving-shaft in said frame, the hopper on said frame, the ear-agitator in said hopper, the trough under said hopper, the push-block, the push-block-actuating lever yieldingly connected to said push-block and the stop in the end of the trough to define the operative movement of said push-block, an ear-discharge slot in said trough adjacent to said stop, a slide arranged to normally close said discharge-slot, a spring arranged to operate said slide in one direction of its movement, a trip-cam mounted in said driving-shaft, and means including a connecting-rod and a cam mounted on said driving-shaft for operating said slide on its opposite movement to open said discharge-slot, substantially as described.

21. In a corn-husker, the combination with the frame, a driving-shaft operatively journaled in said frame, husk-cutting knives operatively arranged to engage an ear of corn and cut the husks free from the ear, and comprising knives slidably journaled in suitable bearings and arranged to reciprocate to and from each other, and to and from the axial path of the movement of said ears of corn, and means including an oppositely-arranged pair of eccentrics operatively mounted on said driving-shaft and connected to said knives for reciprocating said knives to and from each other synchronously, substantially as set forth.

22. In a corn-husker, the combination with the frame, a driving-shaft operatively journaled in said frame, husk-cutting knives operatively arranged to engage an ear of corn and cut the husks from the ear, and comprising knives slidably journaled in suitable bearings and arranged to reciprocate to and from each other, and to and from the axial path of the movement of said ears of corn, and means including an oppositely-arranged pair of eccentrics operatively mounted on said driving-shaft and connected to said knives for reciprocating said knives to and from each other synchronously, and a knife, husk-cleaning device secured to each knife comprising a two-armed lever secured to each knife and movable with said knives a predetermined distance and having one arm arranged to lay normally along the side of the cutting edges of said knives and down by the end of the supporting-bearing of said knives and having the opposite end journaled to said knives and having said lever arranged to be moved by and with said knives on their operative husk-cutting movement, and a spring arranged on the journaled end of said lever adapted to move said lever back into its normal position, and a stop arranged to stop the backward movement of the husk-cleaning end of said lever before the said knives reach the end of their backward movement whereby said knives move backward past the depending end of said lever and brush from the knives any adhering husks, substantially as described.

23. In a corn-husking machine, the combination of the frame, the double knives and the husk-cleaner journaled to said knives and arranged to depend between them and arranged to be moved with said knives a portion of their forward husk-cutting movement, a spring arranged to return them to their normal position on the backward stroke, and a stop arranged and adapted to stop said husk-cleaner at a predetermined portion of the backward stroke of said husk-cutting knives, whereby said knives are passed by said husk-cleaner and any adhering husks are brushed from them, substantially as described.

24. In a corn-husking machine, the combination with the supporting-frame, of a transverse driving-shaft, and a longitudinal driving-shaft operatively supported in said frame, means for rotating said transverse shaft, means for rotating said longitudinal shaft from said transverse driving-shaft, with the hopper and the ear-receiver and an ear-clamping device comprising a block arranged below said ear-receiver to reciprocate intermittently to and from said ear-receiver, a depending shaft on said block, a vertically-reciprocating shaft having a tubular upper end arranged to extend over said depending shaft slidably, a slot through the tubular end of said vertical shaft, a pin through said depending shaft extending through said slot, a compression-spring between the end of said depending shaft and the bottom of said tubular end of said vertical shaft, suitable supports for said vertical shaft, a spring surrounding said vertical shaft and arranged to be compressed when said shaft is raised vertically, and adapted to move said vertical shaft downward when released from its vertical movement, a roller pivotally mounted in the end of said vertical shaft, a drop-off cam rotatably supported in said frame in operative engagement with said vertical shaft to raise and lower it to and from said ear-receiver, and means including suitable gearing for connecting said cam operatively to said longitudinal driving-shaft, substantially as described.

In testimony whereof I affix my signature in presence of two witnesses.

RALPH C. JOHNSON.

Witnesses:
G. SARGENT ELLIOTT,
GRACE P. LINDSLEY.